United States Patent [19]

Carter et al.

[11] 3,784,977

[45] Jan. 8, 1974

[54] SELF-TESTING CHECKING CIRCUIT

[75] Inventors: William C. Carter, Ridgefield, Conn.; Aspi B. Wadia, Shrub Oak, N.Y.

[73] Assignee: International Business Machines Corporation, Armonk, N.Y.

[22] Filed: June 20, 1972

[21] Appl. No.: 264,693

[52] U.S. Cl. .................... 340/146.1 AB, 235/153 A

[51] Int. Cl. .................... G06f 11/12

[58] Field of Search .................... 235/153 A; 340/146.1 AB

[56] References Cited

UNITED STATES PATENTS 3,559,167 1/1971 Carter et al. .............. 340/146.1 AB

*Primary Examiner*—Eugene G. Botz

*Assistant Examiner*—R. Stephen Dildine, Jr.

*Attorney*—Isidore Match et al.

[57] ABSTRACT

There is disclosed a self-testing checking circuit which checks that greater than or equal to $k$ out of n input variables are 1. This circuit has the output (1,0) or (0,1) if the $\geq k$ condition is satisfied and the output (0,0) or (1,1) if it is not. The circuit is self-testing, i.e., every line other than the primary inputs is tested during normal operation. The logical equation representing this circuit is $(c_{k,n},d_{k,n}) = (\bar{a}_n \cdot e_{k,n-1}(a_1,a_2, \ldots ,a_{n-1}),a_n \cdot e_{k-1,n-1}(a_1,a_2, \ldots ,a_{n-1}))$ wherein $a_1, \ldots ,a_n$ are the n input variables, $e_{k,n}(a_1,a_2, \ldots ,a_n)$ denotes the function with the threshold $k$, the function being 1 if greater than or equal to $k$ of the $n$ input variables $a_1,a_2, \ldots ,a_n$ are 1. It is suitably implemented as an OR circuit of $\binom{n}{k}$ AND circuits, each of the latter AND circuits being a conjunct constituted by $k$ of the $n$ input variables. The function $(c_{k,n}d_{k,n})$ is a two-output threshold $k$ function, i.e., it is (0,1) or (1,0) if greater than or equal to $k$ out of the $n$ input variable are 1 and (0,0) otherwise. Logical equations representing the two output k threshold function are $c_{k,n}=\bar{a}_n a_1 a_2 \ldots a_k v \bar{a}_n a_1 a_2 \ldots a_{k-1} a_{k+1} v \ldots v \bar{a}_n a_{n-k} \ldots a_{n-1}$ $d_{k,n}=a_n a_1 a_2 \ldots a_{k-1} \ v \ a_n a_1 a_2 \ldots a_{k-2} a_k \ v \ldots v \ a_n a_{n-k+1} \ldots a_{n-1}$ wherein $v$ represents the OR function.

A two-output self-testing circuit which checks for less than or equal to $k$ out of $n$ input variables equal to 1 is represented by the following logical equation $(g_{k,n},h_{k,n})=(\bar{a}_n v f_{n-k,n-1}(a_1, \ldots , a_{n-1}), a_n v f_{n-k-1,n-1} (a_1, \ldots , a_{n-1}))$ wherein $(g_{k,n}, h_{k,n})$ is the two output threshold which is (0,1) or (1,0) if less than or equal to $k$ out of $n$ input variables are 1, $a_1, \ldots ,a_n$ are the input variables, $f_{k,n}$ is the function with the threshold $k$, i.e., it is 0 if greater than or equal to $k$ out of $n$ inputs are 0. The function $f_{k,n}$ is represented by the following equation $f_{k,n}=(a \ v \ a_2 \ v \ a_2 \ v \ldots v \ a_k) (a_1 v a_2 v \ldots v a_{k-1} v a_{k+1}) \ldots (a_{n-k+1} v \ldots v a_n)$ which comprises $\binom{n}{k}$ OR circuits providing inputs to an AND circuit, each OR circuit being constituted by a disjunct of $k$ input variables. By providing the outputs of both of the two-output circuits mentioned above to a morphic AND circuit, there is provided a circuit which indicates whether greater than or equal to $i$ of the input variables and less than or equal to $k$ of the input variables are 1. When this condition is obtained, the output of the morphic AND circuit is either (0,1) or (1,0).

4 Claims, 9 Drawing Figures

FIG. 2

| | $a_1$ | $a_2$ | $a_3$ | $a_4$ | 100 | 102 | 104 | 106 | 108 | 110 | 112 | 114 | 116 |
|---|---|---|---|---|---|---|---|---|---|---|---|---|---|
| 1 | 0 | 0 | 0 | 0 | 1 | 0 | 0 | 0 | 0 | 0 | 0 | 0 | 0 |
| 2 | 0 | 0 | 0 | 1 | 0 | 0 | 0 | 0 | 0 | 0 | 0 | 0 | 0 |
| 3 | 0 | 0 | 1 | 0 | 1 | 0 | 0 | 0 | 0 | 0 | 0 | 0 | 0 |
| 4 | 0 | 0 | 1 | 1 | 0 | 0 | 0 | 0 | 0 | 0 | 1 | 0 | 1 |
| 5 | 0 | 1 | 0 | 0 | 1 | 0 | 0 | 0 | 0 | 0 | 0 | 0 | 0 |
| 6 | 0 | 1 | 0 | 1 | 0 | 0 | 0 | 0 | 0 | 1 | 0 | 0 | 1 |
| 7 | 0 | 1 | 1 | 0 | 1 | 0 | 0 | 1 | 0 | 0 | 0 | 1 | 0 |
| 8 | 0 | 1 | 1 | 1 | 0 | 0 | 0 | 0 | 0 | 1 | 1 | 0 | 1 |
| 9 | 1 | 0 | 0 | 0 | 1 | 0 | 0 | 0 | 0 | 0 | 0 | 0 | 0 |
| 10 | 1 | 0 | 0 | 1 | 0 | 0 | 0 | 0 | 1 | 0 | 0 | 0 | 1 |
| 11 | 1 | 0 | 1 | 0 | 1 | 0 | 1 | 0 | 0 | 0 | 0 | 1 | 0 |
| 12 | 1 | 0 | 1 | 1 | 0 | 0 | 0 | 0 | 1 | 0 | 1 | 0 | 1 |
| 13 | 1 | 1 | 0 | 0 | 1 | 1 | 0 | 0 | 0 | 0 | 0 | 1 | 0 |
| 14 | 1 | 1 | 0 | 1 | 0 | 0 | 0 | 0 | 1 | 1 | 0 | 0 | 1 |
| 15 | 1 | 1 | 1 | 0 | 1 | 1 | 1 | 1 | 0 | 0 | 0 | 1 | 0 |
| 16 | 1 | 1 | 1 | 1 | 0 | 0 | 0 | 0 | 1 | 1 | 1 | 0 | 1 |

FIG. 3

| | $a_1$ | $a_2$ | $a_3$ | $a_4$ | $a_1$ | $a_2$ | $a_3$ | $a_4$ | 100 | 102 | 104 | 106 | 108 | 110 | 112 | 114 | 116 |
|---|---|---|---|---|---|---|---|---|---|---|---|---|---|---|---|---|---|
| 1 | 0 | 0 | 1 | 1 | | | 0 | 0 | | 1 | 1 | 1 | | | 0 | 1 | 0 |
| 2 | 0 | 1 | 0 | 1 | | 0 | | 0 | | 1 | 1 | 1 | | 0 | | 1 | 0 |
| 3 | 0 | 1 | 1 | 0 | | 0 | 0 | | 0 | | | 0 | 1 | 1 | 1 | 0 | 1 |
| 4 | 0 | 1 | 1 | 1 | | | | | 1 | 1 | 1 | 1 | | | | 1 | 0 |
| 5 | 1 | 0 | 0 | 1 | 0 | | | 0 | | 1 | 1 | 1 | 0 | | | 1 | 0 |
| 6 | 1 | 0 | 1 | 0 | 0 | | 0 | | 0 | | 0 | | 1 | 1 | 1 | 0 | 1 |
| 7 | 1 | 0 | 1 | 1 | | | | | 1 | 1 | 1 | 1 | | | | 1 | 0 |
| 8 | 1 | 1 | 0 | 0 | 0 | 0 | | | 0 | 0 | | | 1 | 1 | 1 | 0 | 1 |
| 9 | 1 | 1 | 0 | 1 | | | | | 1 | 1 | 1 | 1 | | | | 1 | 0 |
| 10 | 1 | 1 | 1 | 0 | | | | | 0 | | | | 1 | 1 | 1 | 0 | 1 |
| 11 | 1 | 1 | 1 | 1 | | | | | 1 | 1 | 1 | 1 | | | | 1 | 0 |

FIG. 5

| | $b_1$ | $b_2$ | $b_3$ | $b_4$ | 118 | 120 | 122 | 124 | 126 | $b_4$ |
|---|---|---|---|---|---|---|---|---|---|---|
| 1 | 0 | 0 | 0 | 0 | 1 | 1 | 1 | 1 | 1 | 0 |
| 2 | 0 | 0 | 0 | 1 | 0 | 0 | 0 | 0 | 0 | 1 |
| 3 | 0 | 0 | 1 | 0 | 1 | 1 | 1 | 1 | 1 | 0 |
| 4 | 0 | 0 | 1 | 1 | 0 | 0 | 0 | 1 | 0 | 1 |
| 5 | 0 | 1 | 0 | 0 | 1 | 1 | 1 | 1 | 1 | 0 |
| 6 | 0 | 1 | 0 | 1 | 0 | 0 | 1 | 0 | 0 | 1 |
| 7 | 0 | 1 | 1 | 0 | 1 | 1 | 1 | 1 | 1 | 0 |
| 8 | 0 | 1 | 1 | 1 | 0 | 0 | 1 | 1 | 0 | 1 |
| 9 | 1 | 0 | 0 | 0 | 1 | 1 | 1 | 1 | 1 | 0 |
| 10 | 1 | 0 | 0 | 1 | 0 | 1 | 0 | 0 | 0 | 1 |
| 11 | 1 | 0 | 1 | 0 | 1 | 1 | 1 | 1 | 1 | 0 |
| 12 | 1 | 0 | 1 | 1 | 0 | 1 | 0 | 1 | 0 | 1 |
| 13 | 1 | 1 | 0 | 0 | 1 | 1 | 1 | 1 | 1 | 0 |
| 14 | 1 | 1 | 0 | 1 | 0 | 1 | 1 | 0 | 0 | 1 |
| 15 | 1 | 1 | 1 | 0 | 1 | 1 | 1 | 1 | 1 | 0 |
| 16 | 1 | 1 | 1 | 1 | 0 | 1 | 1 | 1 | 1 | 1 |

FIG. 6

| | $b_1$ | $b_2$ | $b_3$ | $b_4$ | $b_1$ | $b_2$ | $b_3$ | $b_4$ | 118 | 120 | 122 | 124 | 126 |
|---|---|---|---|---|---|---|---|---|---|---|---|---|---|
| 1 | 0 | 0 | 0 | 0 | | | | | 0 | 0 | 0 | 0 | 0 |
| 2 | 0 | 0 | 0 | 1 | | | | | 1 | | | | 1 |
| 3 | 0 | 0 | 1 | 0 | | | | | 0 | 0 | 0 | 0 | 0 |
| 4 | 0 | 0 | 1 | 1 | | | | | 1 | | | | 1 |
| 5 | 0 | 1 | 0 | 0 | | | | | 0 | 0 | 0 | 0 | 0 |
| 6 | 0 | 1 | 0 | 1 | | | | | 1 | | | | 1 |
| 7 | 0 | 1 | 1 | 0 | | | | | 0 | 0 | 0 | 0 | 0 |
| 8 | 0 | 1 | 1 | 1 | 1 | | | | 1 | 1 | | | 1 |
| 9 | 1 | 0 | 0 | 0 | | | | | 0 | 0 | 0 | 0 | 0 |
| 10 | 1 | 0 | 0 | 1 | | | | | 1 | | | | 1 |
| 11 | 1 | 0 | 1 | 0 | | | | | 0 | 0 | 0 | 0 | 0 |
| 12 | 1 | 0 | 1 | 1 | | 1 | | | 1 | | 1 | | 1 |
| 13 | 1 | 1 | 0 | 0 | | | | | 0 | 0 | 0 | 0 | 0 |
| 14 | 1 | 1 | 0 | 1 | | | 1 | | 1 | | | 1 | 1 |
| 15 | 1 | 1 | 1 | 0 | | | | 1 | | 0 | 0 | 0 | 0 |

FIG. 9

| | $C_1$ | $C_2$ | $C_3$ | $C_4$ | $C_1$ | $C_2$ | $C_3$ | $C_4$ | 128 | 130 | 132 | 134 | 136 | 138 | 140 | 142 | 144 | 146 | 148 | 150 | 152 | 154 | 156 | 158 | 160 | 162 | 164 | 166 |
|---|---|---|---|---|---|---|---|---|---|---|---|---|---|---|---|---|---|---|---|---|---|---|---|---|---|---|---|---|
| 1 | 0 | 0 | 1 | 1 | | | 0 | 0 | | 1 | 1 | 1 | 1 | | | 0 | | | | 1 | 0 | 1 | 1 | 1 | | 0 | 1 | 0 |
| 2 | 0 | 1 | 0 | 1 | | 0 | | 0 | | 0 | 1 | 1 | 1 | | 0 | | 0 | 0 | 0 | 1 | 0 | 0 | | 0 | 1 | 1 | 0 | 1 |
| 3 | 1 | 0 | 0 | 1 | 0 | | | 0 | | 0 | 1 | 1 | 1 | 0 | | | 0 | 0 | 0 | 1 | 0 | 0 | | 0 | 1 | 1 | 0 | 1 |
| 4 | 0 | 1 | 1 | 0 | | 0 | 0 | | 0 | 1 | | | 0 | 1 | 1 | 1 | | | | 0 | 1 | 1 | 0 | | 1 | 1 | 0 | 1 |
| 5 | 1 | 0 | 1 | 0 | 0 | | 0 | | 0 | 1 | | 0 | | 1 | 1 | 1 | | | | 0 | 1 | 1 | 0 | | 1 | 1 | 0 | 1 |
| 6 | 1 | 1 | 0 | 0 | 0 | 0 | | | 0 | 0 | 0 | | | 1 | 1 | 1 | 0 | 0 | 0 | 0 | 1 | 0 | 1 | 1 | 0 | | 1 | 0 |
| 7 | 0 | 1 | 1 | 1 | 1 | | | | 1 | 1 | 1 | 1 | 1 | | | | 1 | | | 1 | 0 | 1 | 1 | 1 | | 0 | 1 | 0 |
| 8 | 1 | 1 | 1 | 0 | | | | 1 | 0 | 1 | | | | 1 | 1 | 1 | | | 1 | 0 | 1 | 1 | 0 | | 1 | 1 | 0 | 1 |
| 9 | 1 | 0 | 1 | 1 | | 1 | | | 1 | 1 | 1 | 1 | 1 | | | | | 1 | | 1 | 0 | 1 | 1 | 1 | | 0 | 1 | 0 |
| 10 | 1 | 1 | 0 | 1 | | | 1 | | 1 | | 1 | 1 | 1 | | | | 0 | 0 | 0 | 1 | 0 | 0 | | 0 | 1 | 1 | 0 | 1 |
| 11 | | | | | | | | | | | | | | | | | | | | | | | | | | | | |

SELF-TESTING CHECKING CIRCUIT

BACKGROUND OF THE INVENTION

This invention relates to self-testing checking circuits. More particularly, it relates to a novel self-testing checking circuit which is capable of checking whether greater than or equal to $k$ out of $n$ input variables are 1.

It is well known to employ electronic computer comparison and logic circuits to perform two distinct types of function, viz., the exact or equality function (=) and the greater than or equal to function ( ≥ ), or, conversely, the less than or equal to function ( ≤ ). The logic functions which implement the ( ≥ ) function are termed "threshold" functions.

A computer application switch, from mathematical analysis, may use as I/O, data which is exact to control functions which use as input, measurements which are inexact and tend to lie in a well defined range, e.g., greater than equal to A but less than or equal to B. This usage can be measured employing threshold functions. In particular, these factors are important in the recognition of correct rather than incorrect patterns. It is, of course, evident that errors in a threshold circuit which is employed in pattern recognition invalidate such recognition.

As computers are used for control, particularly in real time, their reliability becomes increasingly important. Accordingly, input and the measuring circuits have to be checked. In addition, such computers control their own configuration and reliability. In this control, a most important feature is the use of threshold functions. The development of such switching and control schemes has been the object of extensive investigation heretofore. In this connection, reference is directed to U.S. Pat. No. 3,665,418 of W. G. Bouricius et al and assigned to the IBM Corporation. An important requirement of threshold circuits is that they, themselves, should also be checkable. Another important use for threshold circuits is in the threshold decoding of information codes.

Heretofore, it had been assumed that the threshold circuits, employed as mentioned hereinabove, had a lesser probability of failure than the rest of the system. Accordingly, it has been believed that the threshold circuits did not have to be checked and formed the "hard core" of the system, i.e., the portion which had to operate correctly for correct system operation. However, with the present advent of high reliability systems, such assumption is no longer tenable.

Accordingly, it is an important object of this system to provide self-testing checking circuits which are capable of detecting errors within threshold circuits in a computing system, a pattern recognition system, a decoding system or similar related electronic control system.

It is another object to provide a self-testing checking circuit which checks that greater than or equal to $k$ out of $n$ input variables are 1.

SUMMARY OF THE INVENTION

In accordance with the invention, there is provided a circuit which checks that greater than or equal to $k$ out of $n$ input variables are 1. This circuit has the output (1.0) or (0.1) if the ≥ $k$ condition is satisfied and (0.0) if it is not. The circuit is self-testing, i.e., every line other than the primary inputs is tested during normal operation.

The circuit is represented by the equation $$(c_{k,n},d_{k,n})=(\bar{a}_n.e_{k,n-1}\ (a_1,a_2,\ldots,a_{n-1}),\ a_n,e_{k-1,n-1}\ (a_1,a_2,\ldots,a_{n-1}))$$

wherein $e_{k,n}\ (a_1,a_2,\ldots,a_n)$ denotes the function with threshold $k$, i.e., the function is 1 if greater than or equal to $k$ of the $n$ input variables $a_1,a_2,\ldots,a_n$ are 1 and wherein $(c_{k,n},d_{k,n})$ denotes the two output threshold $k$ function, i.e., the latter function is equal to (0,1) or (1,0) if greater than or equal to $k$ of the $n$ input variables are 1, and (0,0) otherwise. The function $e_{k,n}$ can be implemented as an OR circuit of $\binom{n}{k}$ AND circuits, each of the latter AND circuits being a conjunct constituted by $k$ of the $n$ input variables. The terms $c_{k,n}$ and $d_{k,n}$ are represented by the following logical equations $$c_{k,n}=\bar{a}_na_1a_2\ldots a_k\ v\ \bar{a}_na_1a_2\ldots a_{k-1}\ v\ldots v\ \bar{a}_na_{n-k}\ldots a_{n-1}$$

$$d_{k,n}=a_na_1a_2\ldots a_{k-1}\ v\ a_na_1a_2\ldots a_{k-2}a_k\ v\ldots v\ a_na_{n-k+1}\ldots a_{n-1}$$

wherein $v$ represents the OR function.

There is also provided, according to the invention, a less than or equal to $k$ output circuit, i.e., one which gives an output of (1,0) or (0,1) if less than or equal to $k$ out of $n$ inputs are 1. The two output less than or equal to $k$ out of $n$ circuit is represented by the following equation $$(g_{k,n},h_{k,n})=(\bar{a}_nvf_{n-k,n-1}(a_1,\ldots a_{n-1}),a_nvf_{n-k-1,n-1}(a_1,\ldots a_{n-1}))$$

wherein $f_{k,n}$ is the function that is 0 if greater than or equal to $k$ out of $n$ inputs are 0. This function is represented by the following equation $$f_{k,n}=(av_2v\ldots va_k)\ (a_1va_2v\ldots va_{k-1}va_{k+1})\ldots(a_{n-k+1}v\ldots va_n)$$

which consists of $\binom{n}{k}$ OR circuits providing inputs to an AND circuit, each of the OR circuits being constituted by a disjunct of $k$ input variables.

When the two-output circuits described hereinabove provide their output pairs to a morphic AND circuit, there results a self-testing circuit which checks whether greater than or equal to $i$ and less than or equal to $k$ of the input variables are 1.

The foregoing and other objects, features and advantages of the invention will be apparent from the more particular description of preferred embodiments of the invention, as illustrated in the accompanying drawings.

BRIEF DESCRIPTION OF THE DRAWINGS

In the drawings,

FIG. 2 is a chart which shows the values of the output lines for different values of the inputs in the circuit of FIG. 1;

FIG. 3 is a chart which shows the faults that can be detected for each possible set of inputs that can appear during normal operation in the circuit of FIG. 1;

FIG. 5 is a chart which shows the values of output lines for different values of the inputs in the circuit of FIG. 4;

FIG. 6 is a chart which sets forth the faults that can be detected for each possible set of inputs that can appear during normal operation in the circuit of FIG. 4;

FIG. 9 is a chart which sets forth the faults that can be detected for each possible set of inputs that can appear during normal operation in the circuit of FIG. 8.

DESCRIPTION OF A PREFERRED EMBODIMENT

The invention described hereinbelow is a generalized circuit which checks that greater than or equal to $k$ out of $n$ input variables are 1. This circuit has the output (1,0) and (0,1) if the $\geqslant k$ condition is satisfied, and (0,0) if it is not. The circuit is self-testing, i.e., every line other than the primary inputs is tested during normal operation.

In considering the theory underlying the invention, let $e_{k,n}(a_1,a_2, \ldots, a_n)$ denote the function with the threshold $k$, i.e., the function is 1 if greater than or equal to $k$ of the $n$ input variables $a_1,a_2, \ldots, a_n$ are 1. Let $(c_{k,n}d_{k,n})$ denote the two output threshold $k$ function, i.e., $(c_{k,n},d_{k,n})=(0,1)$ or (1,0) if greater than or equal to $k$ out of the $n$ input variables are 1 and (0,0) otherwise. An implementation of such function is as follows:

$$(c_{k,n},d_{k,n})=(\bar{a}_n.e_{k,n-1}(a_1,a_2, \ldots, a_{n-1}),a_n.e_{k-1,n-1}(a_1,a_2, \ldots, a_{n-1})$$

This implementation follows from the fact that greater than equal to $k$ out of $n$ of the input variables $a_1,a_2, \ldots, a_n$ are 1 if either $a_n=0$ and greater than or equal to $k$ out of $n-1$ of the input variables $a_1,a_2, \ldots, a_{n-1}$ are 1 or $a_n=1$ and greater than or equal to $k-1$ out of the $n-1$ input variables $a_1,a_2, \ldots, a_{n-1}$ are 1. As $e_{k,n}$ can be implemented as an OR fed by $\binom{n}{k}$ AND circuits, each being a conjunct composed of exactly $k$ of the $n$ input variables, $c_{k,n}$ and $d_{k,n}$ can be implemented as follows: conjuncts of $k$ variables out of the $n-1$ variables $a_1,a_2, \ldots, a_{n-1}$ $$c_{k,n}=\overbrace{\bar{a}_n a_1 a_2 \ldots a_k} v \overbrace{\bar{a}_n a_1 a_2 \ldots a_{k-1} a_{k+1}} v \ldots v \overbrace{\bar{a}_n a_{n-k} \ldots a_{n-1}}$$

$$d_{k,n}=a_n \underbrace{a_1 a_2 \ldots a_{k-1}} v\, a_n \underbrace{a_1 a_2 \ldots a_{k-2} a_k} v \ldots v\, a_n \underbrace{a_{n-k+1} \ldots a_{n-1}}$$

conjuncts of $k-1$ variables out of $n-1$ variables $a_1,a_2, \ldots, a_n$. The above implementation comprises $\binom{n-1}{k}$ + $\binom{n-1}{k-1}$ AND circuits two OR circuits and one inverter and is self-testing.

The terms $\binom{n}{k}$, $\binom{n-1}{k}$ and $\binom{n-1}{k-1}$ employed hereinabove correspond to the term $\binom{i}{j}$ as it is used in combinatorial mathematics. In use $\binom{i}{j}$ for $0 \leqslant j \leqslant i$ is defined as the number of combinations of $i$ objects taken $j$ at a time. This is equal to the integer $i(i-1) \ldots (i-j+1)/(1 \cdot 2 \ldots j)$.

Figure 1:
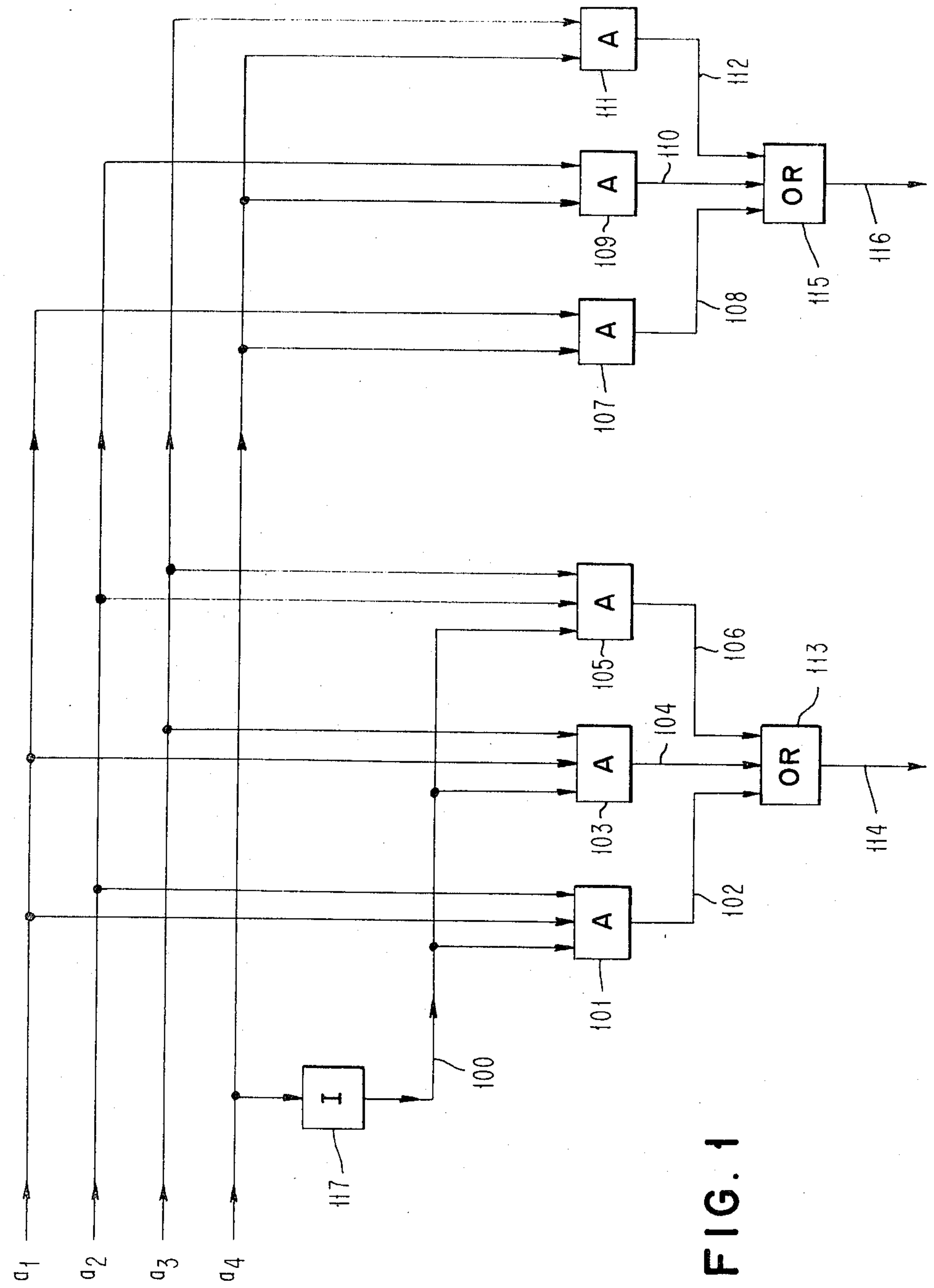
FIG. 1 is a depiction of a preferred embodiment of a self-testing circuit, constructed according to the invention, which checks whether greater than or equal to two out of four input variables are 1.

Reference is now made to FIG. 1 wherein there is shown an embodiment of a "greater than equal to two out of four" circuit.

As seen in FIG. 1, input $a_1$ is applied to the AND circuits 101, 103 and 107; input $a_2$ is applied to the AND circuits 101, 105 and 109; input $a_3$ is applied to the AND circuits 103, 105 and 111; and input $a_4$ is applied to the AND circuits 107, 109 and 111. In addition, the output of the inverter 117, i.e., the inversion of input $a_4$ is applied to AND circuits 101, 103 and 105. The output lines of AND circuits 101, 103 and 105, i.e., lines 102, 104 and 106 respectively, are applied to an OR circuit 113 which has the output line 114. The output lines of AND circuits 107, 109 and 111, i.e., lines 108, 110 and 112, respectively, are applied to an OR circuit 115 which had the output line 116.

In the circuit depicted in FIG. 1, in the absence of errors, outputs are produced on lines 114 and 116 of (0,1) or (1,0) if at least two of the inputs, $a_1$, $a_2$, $a_3$ or $a_4$ are present. If less than two inputs are present and the circuit is error free, the outputs on lines 114 and 115 are (0,0).

In FIG. 2, there is shown a chart which indicates the values of the output lines of FIG. 1 for the various values of the inputs $a_1$, $a_2$, $a_3$ and $a_4$ if the circuit is error free. It is seen in this chart that in rows 1, 2, 3, 5, and 9, where there are less than two inputs present, the output values on lines 114 and 116 are (0,0). In all of the other rows in the chart of FIG. 2, there are two or more inputs present and the values on lines 114 and 116 are either (0,1) or (1,0).

In FIG. 3, there is depicted a chart which shows for various values of inputs ($a_1$,$a_2$,$a_3$ and $a_4$) the ability of the circuit in FIG. 1 to detect lines stuck at either "0" or "1". Where there is no entry in the chart, it signifies that the circuit will not detect lines stuck at either 0 or 1 for that particular set of input values. For example, in row 1 of FIG. 3, if any one of lines 102, 104, 106 and 114 is stuck at 1, or if any of the lines 112 and 116 are stuck at 0, this stuck condition will be detected when the input pattern of row 1 appears. It is to be noted in the chart of FIG. 3 that each column thereby contains at least one 0 or one 1. This signifies that if the proper pattern of input values are applied, and this will be the case as these are patterns that appear during normal operation, any one internal line that is stuck at either 0 or 1 can be detected.

An approach similar to the approach taken in the design of the circuit of FIG. 1 can be taken in the designing of less than equal to $k$ out of $n$ circuits, i.e., circuits which given an output of (0,1) or (1,0) if less than or equal to $k$ out of $n$ inputs of 1.

In this latter connection, let $f_{k,n}$ be the function that is 0 if greater than or equal to $k$ out of $n$ inputs are 0. Such function can be realized as a two level OR-AND circuit expressed as follows:

$f_{k,n} = (a_1 v a_2 v \ldots v\, a_k)\ (a_1 v a_2 v \ldots v a_{k-1} v a_{k+1}) \ldots (a_{n-k+1}, \ldots, a_n)$ $\binom{n}{k}$ OR circuit feeding a single AND circuit, each OR circuit realizing a disjunct of $k$ input variables.

A two output less than or equal to $k$ out of $n$ circuit, i.e., a circuit that gives an output of (0,1) or (1,0) if $k$ or less of its inputs are 1, can be realized as follows:

$$(g_{k,n}, h_{k,n}) = (\bar{a}_n\ v\ f_{n-k,n-1}\ (a_1, \ldots, a_{n-1}), a_n v f_{n-k-1,n-1}\ (a_1, \ldots, a_{n-1}))$$

Figure 4:
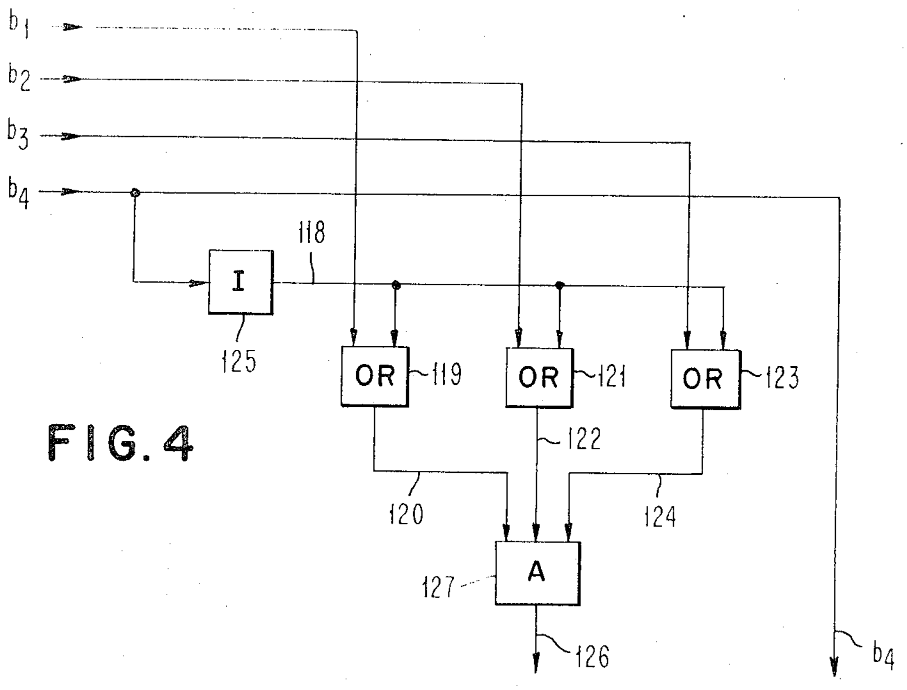
FIG. 4 is a schematic drawing of an embodiment of a self-testing circuit, constructed according to the invention, which checks whether less than or equal to three out of four inputs are 1.

In FIG. 4, there is shown an embodiment of a self-testing "less than or equal to 3 out of 4" circuit constructured according to the invention. This circuit is shown to have 4 inputs, i.e., $b_1$, $b_2$, $b_3$ and $b_4$. Inputs $b_1$, $b_2$ and $b_3$ are applied to OR circuits 119, 121 and 123, respectively. Input $b_4$ is applied to an inverter 125. The output line 118 of inverter 125 being applied as an input to all three of OR circuits, 119, 121 and 123. The output lines 120, 122 and 124 of OR circuits 119, 121, and 123 are applied as inputs to an AND circuit 127 which has as an output line 126. The input line $b_4$ is treated as the second output line.

In FIG. 5, there is depicted a chart which indicates the values of the lines shown in FIG. 4. If the circuit is error free for various inputs as indicated in FIG. 5, the values of the output lines 126 and $b_4$ are (1,0), or (0,1) if there are less than four inputs present. If four inputs are present, the values of the output lines 126 and $b_4$ are (1,1).

In FIG. 6, there is depicted a chart which shows, for various values of inputs $b_1$, $b_2$, $b_3$, and $b_4$ of the circuit of FIG. 4, the ability of the circuit to detect lines stuck at either 0 or 1. At those places in the chart of FIG. 6 where there is no entry, this circuit cannot detect that the line is stuck at either 0 or 1 for the particular set of values for input.

Figure 7:
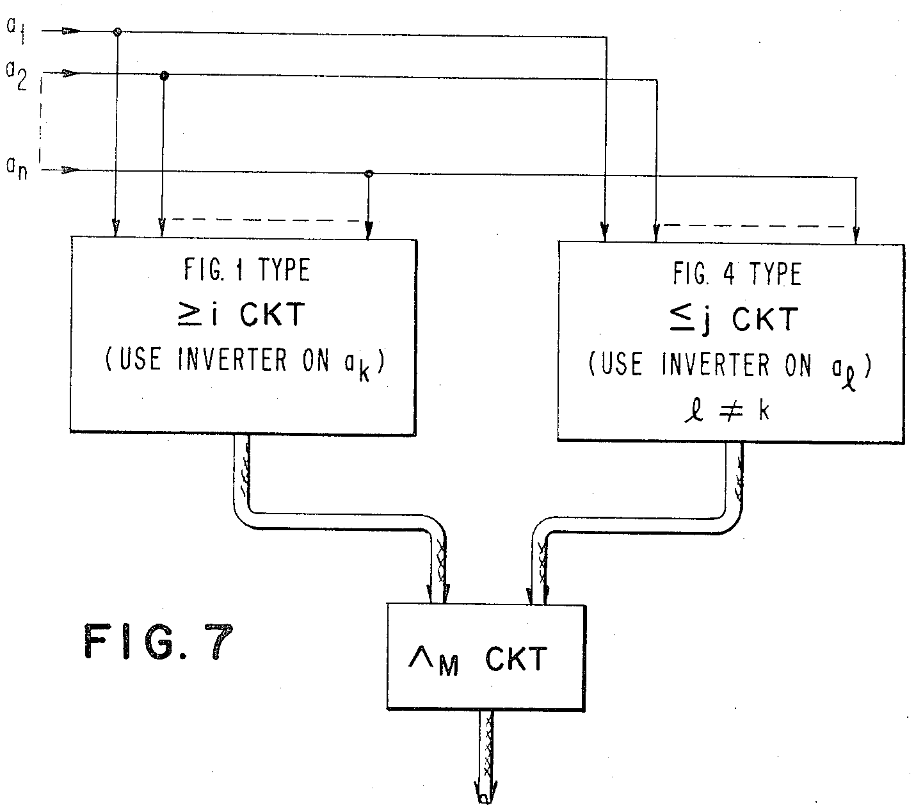
FIG. 7 is a block diagram of a circuit which checks whether greater than or equal to $i$, less than or equal to $j$ out of $n$ inputs are 1.

Using the type of threshold circuits as shown in FIGS. 1 and 4, respectively, there can be implemented "window" circuits, i.e., circuits which give an indication if greater than or equal to $i$ and less than or equal to $k$ of the input variables are 1. Such circuits can be implemented as shown in FIG. 7. In FIG. 7, the block legended $m$ which is a morphic AND block, also termed an RCCO circuit, i.e., reduction circuit for checker outputs as described in U.S. Pat. No. 3,559,167, is a circuit which produces (0,1) or (1,0) output if both of the pairs have a (0,1) or (1,0). It was observed in both of the circuits of FIGS. 1 and 4, i.e., $\geqslant i$ and $\leqslant j$ circuits, that there is required precisely one inverter on one of the inputs lines. In order to make the final morphic AND block $\Lambda$ or testable in normal operation, the input line which is used in an inverter in the $\geqslant i$ circuit (FIG. 1), FIG. 1 should be different from the line which is used with an inverter in the $\leqslant j$. Only then will all $\binom{\overline{0,1}}{1,0} \times \binom{\overline{0,1}}{1,0}$ patterns appear at the input of the $\Lambda_m$ block and thus make the entire circuit testable.

Figure 8:
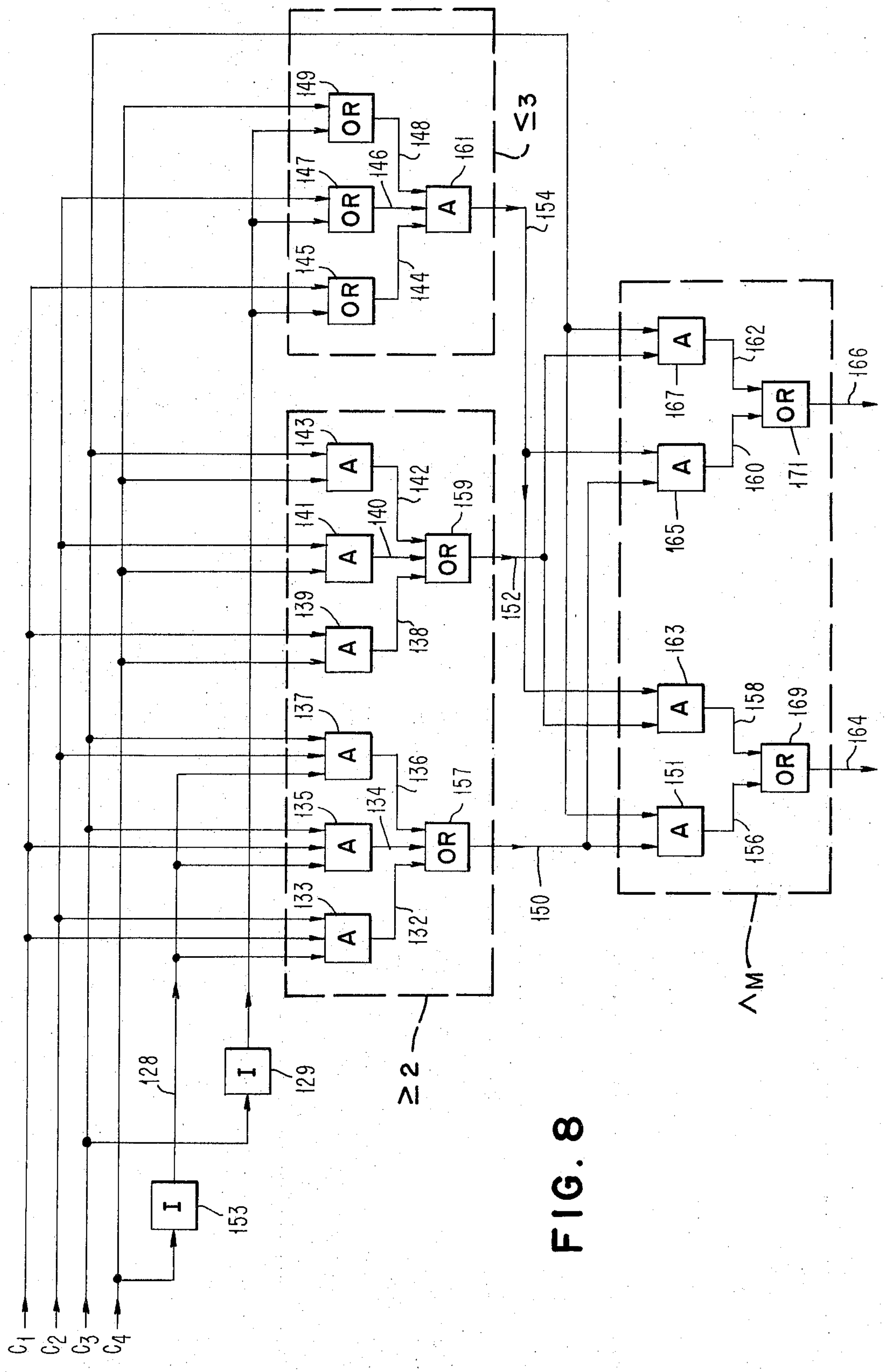
FIG. 8 is a schematic drawing of a particular embodiment of the circuit shown in block form in FIG. 7, i.e., a circuit which checks whether greater than or equal to two, less than or equal to three out of four inputs are 1.

In FIG. 8, there is shown an embodiment of a greater than or equal to 2, less than or equal to 3 out of 4 circuit. In this circuit, the inputs are $c_1$, $c_2$, $c_3$ and $c_4$ and input $c_1$ is applied to AND circuits 133, 135 and 139 and to an OR circuit 145. The $c_2$ is applied to AND circuits 133, 137 and 141 and to OR circuit 147. The $c_3$ input is applied to an inverter 149, to AND circuits 135, 137 and 143 and to AND circuits 151 and 167. The $c_4$ input is applied to an inverter 153, to AND circuits 139, 141 and 143 and to an OR circuit 149. The output of inverter 153 which appears on a line 128 is applied to AND circuits 133, 135 and 137. The output of inverter circuit 149 which appears on a line 130 is applied to OR circuits 145, 147 and 149.

The outputs of AND circuits 133, 135 and 137 which appear on lines 132, 134 and 136 are applied to an OR circuit 157 which has an output line 150. The outputs of AND circuits 139, 141 and 143 which appear on lines 138, 140 and 142, respectively, are applied to an OR circuit 159 which has an output line 152. The outputs of OR circuits 145, 147 and 149 on lines 144, 146 and 148, respectively, are applied to an AND circuit 161 which has an output line 154. Line 154 and the $c_3$ input are applied to AND circuit 151, AND circuit 151 having an output line 156. Lines 152 and 154 are applied as inputs to AND circuit 163 which has an output line 158. Lines 154 and 150 are applied as inputs to AND circuit 165 which has an output line 160. Line 152 and the $c_3$ input are applied to AND circuit 167 which has an output line 162. Lines 156 and 158 are applied to OR circuit 169 which has an output line 164 and lines 160 and 162 are applied to OR circuit 171 which has an output line 166. The dashed line block containing AND circuits 133, 135, 137, 139, 141 and 143 and OR circuits 157 and 159 represent an embodiment of a $\geqslant 2$ circuit. The dashed line block containing OR circuits 145, 147 and 149 and AND circuit 161 and $c_3$ represent a $\leqslant 3$ circuit. The dashed line block containing AND circuits 151, 163, 165 and 167 and OR circuits 169 and 171 represents a $\Lambda_m$ circuit, i.e., a morphic AND (RCCO) circuit.

In the circuit shown in FIG. 8, it is to be noted that if there are less than two inputs present, the values of output lines 164 and 166 will be (0,0). For at least two inputs and not more than three inputs, the values of the output lines 164 and 166 will be (0,1) or (1,0). If four inputs are present, the values of the output lines 164 and 166 will be (1,1).

In FIG. 9, there is shown a chart which sets forth for various values of inputs ($c_1$, $c_2$, $c_3$, and $c_4$), the ability of the circuit shown in FIG. 8 to detect lines stuck at either 0 or 1. In this chart, as in the charts previously described hereinabove, if there is no entry in the table at a particular location, this signifies that the circuit cannot detect that the line is stuck at either 0 or 1 for that particular set of input values.

The circuit shown in FIG. 8 has the ability to check all inputs for stuck at 1 or stuck at 0 by applying inputs which are within the range of the window as discussed hereinabove. The window for the circuit of FIG. 8 is "inputs greater than or equal to 2 and less than or equal to 3 out of 4 inputs." Such window dimensions do not obtain in the circuit shown in FIGS. 1 and 4. Thus, referring to FIG. 3, it is to be noted that in order to check for inputs stuck at 1, it is necessary to apply less than two inputs. Similarly, as shown in FIG. 6 relative to the circuit of FIG. 4, it is to be noted that in order to check for inputs stuck at 0, it is necessary to apply four inputs.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A self-testing circuit which checks that greater than or equal to $k$ out of $n$ input variables are 1 comprising:

a circuit represented by the following logical equation $$(c_{k,n},d_{k,n})=(\bar{a}_n.e_{k,n-1}(a_1,a_2, \ldots ,a_{n-1}), a_n.e_{k-1,n-1}(a_1,a_2, \ldots ,a_{n-1}))$$

wherein $a_1, \ldots ,a_n$ are said input variables, $e_{k,n}$ is a function which is implemented by a circuit comprising $\binom{n}{k}$ AND circuits, feeding an OR circuit, wherein $\binom{n}{k}$ for $0 \leqslant k \leqslant n$ being defined as the number of combinations of $n$ elements taken $k$ at a time, which is equal to the integer $n(n-1) \ldots (n-k+1)/(1\cdot2 \ldots k)$, each of said last named AND circuits being a conjunct composed of $k$ of the $n$ input variables, and wherein $(c_{k,n},d_{k,n}) = (0,1)$ or $(1,0)$ if greater than or equal to $k$ out of $n$ input variables are 1 and $(0,0)$ if it is not.

2. A self-testing circuit which checks that greater than or equal to $k$ out of $n$ input variables are 1 comprising:

a circuit represented by the following logical equation $$(c_{k,n},d_{k,n})=(\bar{a}_n\cdot e_{k,n-1}(a_1,a_2,\ldots,a_{n-1}),\ a_n\cdot e_{k-1,n-1}(a_1,a_2,\ldots,a_{n-1}))$$

wherein $a_1,\ldots,a_n$ are said input variables, $e_{k,n}$ is a function which is implemented by a circuit of $\binom{n}{k}$ AND circuits, feeding an OR circuit, wherein $\binom{n}{k}$ for $0 \leq k \leq n$ being defined as the number of combinations of $n$ elements taken $k$ at a time, which is equal to the integer $n(n-1)\ldots(n-k+1)/(1\cdot k\ldots k)$, each of said AND circuits being a conjunct of $k$ of the $n$ input variables and $(c_{k,n},d_{k,n})$ is a two-output threshold $k$ function which is $(0,1)$ or $(1,0)$ if greater than or equal to $k$ out of said $n$ input variables are 1, and $(0,0)$ if otherwise, said two output threshold $k$ function being represented by the following logical equations $$[c_{k,n} = \bar{a}_n a_1 a_2 \ldots a_k v \bar{a}_n a_1 a_2 \ldots a_{k-1} a_{k+1} v \ldots v \bar{a}_n a_{n-k} \ldots a_{n-1}]\ c_{k,n} = \bar{a}_n a_1 a_2 \ldots a_k v \bar{a}_n a_1 a_2 \ldots a_{k-1} a_{k+1} v \ldots v \bar{a}_n a_{n-k} \ldots a_{n-1}$$

and $$d_{k,n} = a_n a_1 a_2 \ldots a_{k-1} v a_n a_1 a_2 \ldots a_{k-2} a_k v \ldots v a_n a_{n-k+1} \ldots a_{n-1}$$

wherein $a_1,\ldots,a_n$ have their previous significance and $v$ represents the OR function.

3. A self-testing circuit which checks that less than or equal to $k$ out of $n$ input variables are 1 comprising:

a circuit represented by the following equation $$(g_{k,n},h_{k,n}) = (\bar{a}_n f_{n-k,n-1}(a_1,\ldots,a_{n-1}), a_n f_{n-k-1,n-1}(a_1,\ldots,a_{n-1}))$$

wherein $a_1,\ldots,a_n$ are said input variables, and the function $f_{n-k,n-1}$ is represented by the equation $$f_{n-k-1,n-1}=(a_1 v a_2 v \ldots a_{n-k-1})\ (a_1 v a_2 v \ldots v a_{n-k-2} v a_{n-k}) \ldots (a_{k-1},\ldots,a_{n-1})$$

wherein $v$ represents the OR function, and which comprises $\binom{n-1}{n-k-1}$ OR circuits feeding a single AND circuit, said term $\binom{n-1}{n-k-1}$ being equivalent to the term $\binom{i}{j}$ for $0 \leq j \leq i$ which is defined as the number of combinations of $i$ objects taken $j$ at a time which is equal to the integer $i(i-1)\ldots(i-j+1)/(1\cdot\ldots j)$, each circuit being constituted by a disjunct of $n-k-1$ input variables;

said function $(g_{k,n},h_{k,n})$ being $(0,1)$ or $(1,0)$ if said $k$ or less of said input variables are 1.

4. A self-testing arrangement which checks that greater than or equal to $i$ and less than or equal to $k$ of $n$ input variables are 1 comprising:

a first circuit represented by the following logical equation $$(c_{i,n},d_{i,n})=(\bar{a}_n\cdot e_{i,n-1}(a_1,a_2,\ldots,a_{n-1}),a_n e_{i-1,n-1}(a_1,a_2,\ldots,a_{n-1}))$$

wherein $c_{i,n}$ is a function which is implemented by an OR circuit fed by $\binom{n}{i}$ AND circuits, said term $\binom{n}{i}$ for $0 \leq i \leq n$ is defined as the number of combinations of $n$ elements taken $i$ at a time, which is equal to the integer $n(n-1)\ldots(n-i+1)/(1\cdot 2\ldots i)$, each of said AND circuits being a conjunct of $i$ of the $n$ input variables, $a_1,\ldots,a_n$ are said input variables, said $c_{i,n}$ function being a circuit represented by the following equation $$c_{i,n}=\bar{a}_n a_1 a_2 \ldots a_i v \bar{a}_n a_1 a_2 \ldots a_{i-1} a_{i+1} v \ldots v \bar{a}_n a_{n-i} \ldots a_{n-1}$$

wherein $a_1,\ldots,a_n$ are said $n$ input variables and $v$ represents the OR function, said $d_{i,n}$ function being a circuit represented by the following equation $$d_{i,n}=a_n a_1 a_2 \ldots a_{i-1} v a_n a_1 a_2 \ldots a_{i-2} a_i v \ldots v a_n a_{n-i+1} \ldots a_{n-1}$$

wherein $a_1,\ldots,a_n$ are said input variables and $v$ represents the OR function;

a second circuit represented by the following equation $$(g_{k,n},h_{k,n})=(\bar{a}_n v f_{n-k,n-1}(a_1,\ldots,a_{n-1}),a_n v f_{n-k-1,n-1}(a_1,\ldots,a_{n-1}))$$

wherein $a_1 \ldots a_n$ are said $n$ input variables, $v$ represents the OR function and $f_{k,n}$ is a function that is 0 if greater than or equal to $k$ out of $n$ inputs are 0, said function $f_{k,n}$ being a circuit represented by the equation $$f_{k,n}=(a_1 v a_2 v \ldots v a_k)\ (a_1 v a_2 v \ldots a_{k-1} v a_{k+1}) \ldots (a_{n-k+1},\ldots,a_n)$$

wherein $a_1,\ldots,a_n$ are said input variables and $v$ represents the OR function and wherein said last-named circuit comprises $\binom{n}{k}$ OR circuits feeding a single AND circuit, said term $\binom{n}{k}$ for $0 \leq k \leq n$ being defined as the number of combinations of $n$ elements taken $k$ at a time, which is equal to the integer $n(n-1)\ldots(n-k+1)/(1\cdot 2\ldots k)$, each of said last-named OR circuits being constituted by a disjunct of $k$ input variables; and a morphic AND circuit for receiving the outputs of said first and second circuits to provide a single self-testing output pair.

* * * * *

PO-1050 (5/69)

UNITED STATES PATENT OFFICE
CERTIFICATE OF CORRECTION

Patent No. 3,784,977 Dated January 8, 1974

Inventor(s) William C. Carter and Aspi B. Wadia

It is certified that error appears in the above-identified patent and that said Letters Patent are hereby corrected as shown below:

| | |
|---|---|
| Col. 2, line 17 | "$a_{k-1}$ V" should be -- $a_{1-1}$ $a_{k+1}$ V... -- |
| Col. 3, line 36 | "...,$a_{n-1}$) should be -- ...,$a_{n-1}$)) -- |
| Col. 4, line 17 | "115" should be -- 116 -- |
| Col. 6, line 36 | "window" should be -- "window" -- |
| Col. 6, line 37 | "window" should be -- "window" -- |
| Claim 2, line 16 | "1˙k..." should be -- 1˙2... -- |
| Claim 2, line 24 | Delete the line |
| Claim 2, line 25 | Delete "...$a_{n-1}$]" |
| Claim 3, line 46 | "(1...j)" should be -- (1-2)...(j)-- |

Signed and sealed this 15th day of October 1974.

(SEAL)
Attest:

McCOY M. GIBSON JR.
Attesting Officer

C. MARSHALL DANN
Commissioner of Patents